United States Patent
Munroe et al.

(10) Patent No.: US 7,782,911 B2
(45) Date of Patent: Aug. 24, 2010

(54) METHOD AND APPARATUS FOR INCREASING FIBER LASER OUTPUT POWER

(75) Inventors: Michael J. Munroe, Eugene, OR (US); David H. Foster, Corvallis, OR (US); Joseph G. LaChapelle, Philomath, OR (US); Cary S. Kiest, Albany, OR (US)

(73) Assignee: Deep Photonics Corporation, Corvallis, OR (US)

( * ) Notice: Subject to any disclaimer, the term of this patent is extended or adjusted under 35 U.S.C. 154(b) by 108 days.

(21) Appl. No.: 12/033,759

(22) Filed: Feb. 19, 2008

(65) Prior Publication Data

US 2008/0198880 A1    Aug. 21, 2008

Related U.S. Application Data

(60) Provisional application No. 60/891,021, filed on Feb. 21, 2007.

(51) Int. Cl.
 *H01S 3/30* (2006.01)
(52) U.S. Cl. .............................. 372/6; 385/4; 385/123
(58) Field of Classification Search ............... 372/6
 See application file for complete search history.

(56) References Cited

U.S. PATENT DOCUMENTS 5,566,381 A    10/1996    Korotky
6,331,908 B1    12/2001    Adams et al.
6,347,007 B1    2/2002    Grubb et al.
6,516,113 B1    2/2003    Glingener et al.
6,587,623 B1    7/2003    Papen et al.
6,724,528 B2 *    4/2004    Koplow et al. ........... 359/341.1
7,130,514 B1    10/2006    Chen et al.

OTHER PUBLICATIONS

K. K. Y. Wong et al., "Temperature control of the gain spectrum of fiber optical parametric amplifiers," .Optics Express, vol. 13, No. 12, 4666-4673, Jun. 2005.*
Brown et al., "Thermal, Stress, and Thermo-Optic Effects in High Average Power Double-Clad Silica Fiber Lasers," IEEE Journal of Quantum Electronics, (Feb. 2001), 37(2):207-217.
Kovalev et al., "Suppression of Stimulated Brillouin Scattering in High-Power Single-Frequency Fiber Amplifiers," Optics Letters, 2006, 31(2):161-163.
Mao et al., "Brillouin Scattering in Externally Modulated Lightwave AM-VSB CATV Transmission Systems," IEEE Journal of Photonics Technology Letters, (Mar. 1992), 4(3): 287-289.

* cited by examiner

*Primary Examiner*—Armando Rodriguez
*Assistant Examiner*—Xnning Niu
(74) *Attorney, Agent, or Firm*—Townsend and Townsend and Crew LLP

(57) ABSTRACT

A fiber laser with reduced stimulated Brillouin scattering includes a spool having a height and characterized by an induced temperature gradient with the height. The fiber laser also includes a fiber wrapped on the spool and characterized by a signal power increasing along the length of the fiber. The induced temperature gradient is a function of the signal power along the fiber.

23 Claims, 5 Drawing Sheets

METHOD AND APPARATUS FOR INCREASING FIBER LASER OUTPUT POWER

CROSS-REFERENCES TO RELATED APPLICATIONS

This application claims priority to U.S. Provisional Patent Application No. 60/891,021, filed on Feb. 21, 2007, the disclosure of which is hereby incorporated by reference in its entirety for all purposes.

BACKGROUND OF THE INVENTION

The present invention relates generally to optical systems. More particularly, the invention includes a method and structure for increasing output power in fiber laser systems. Merely by way of example, the invention has been applied to a temperature controlled length of optical fiber characterized by reduced non-linear optical effects. But it would be recognized that the invention has a much broader range of applicability.

Fiber lasers have advanced to become robust and efficient high powered infrared laser sources. Average output powers of tens of kilowatts are currently available in commercial fiber laser systems. FIG. 1 is a schematic of a conventional fiber laser system in a master oscillator/fiber amplifier configuration. The seed laser 120 emits a low power optical signal that is coupled into the amplifier section 140 through an optical isolator 130. The optical isolator protects the seed laser from light counter-propagating back through the amplifier section. The amplifier section consists of a length of gain fiber that is pumped by one or more pump lasers 160 (typically diode lasers) through a pump coupler 150. The gain fiber may be multi or single spatial mode(s), polarization random or maintaining, cladding pumped or core pumped, and with a variety of atomic dopants, depending on the emission and pumping wavelengths. The pump laser light is absorbed by the dopants in the gain fiber, raising the dopants into an excited state. The seed is amplified through stimulated emission as it interacts with the excited dopants.

A laser may be constructed using an optical fiber as the gain medium and are pumped with optical energy. Fibers are typically glass-type materials, though may be crystalline or glass-nano-crystal composites, and are commonly doped with atoms from a set {Yb, Er, Nd, Pr, Tm, Cr}. The fiber laser gain architectures include single pass gain, confined cavity, master oscillator/fiber amplifier(s), and the like. Many variants of fiber laser design are commonly employed, e.g. multiple gain stages with multiple pumps, inclusion of various filtering elements, a delivery fiber at the output of the laser, and use of forward- and/or backward-propagating pumps. Fiber lasers can operate with a wide range of output parameters to satisfy the varying constraints of an application, with the specifications of the individual fiber amplifier subsystems driving the down-selection of components. The output emission of a fiber laser can be specified with the average output optical power, peak output optical power, temporal pulse width, center optical wavelength, polarization, spatial mode, and spectral bandwidth.

The components selected to achieve these characteristics include a master oscillator that generates linear polarized infrared laser radiation, a polarization-maintaining optical isolator that attenuates the backward propagating light from the fiber amplifier while transmitting the forward propagating light from the master oscillator, and a fiber amplifier that contains a power amplifier that amplifies the master oscillator emission transmitted through the isolator. Examples of fiber amplifiers include a polarization-maintaining, large-mode-area, double-clad {Yb—, Er—, Yb:Er—} doped gain fiber. Components also include one or more diode pump lasers typically based upon AlGaAs/GaAs designs that emit light of selected wavelengths from a range 910-985 nm, and a means of coupling the emission from the diode pump lasers into the gain fiber.

Despite the progress made in the development of fiber laser systems, there is a need in the art for improved methods and systems related to fiber laser amplifiers and fiber laser systems.

SUMMARY OF THE INVENTION

According to the present invention, techniques for optical systems are provided. More particularly, the invention includes a method and structure for increasing output power in fiber laser systems. Merely by way of example, the invention has been applied to a temperature controlled length of optical fiber characterized by reduced non-linear optical effects. But it would be recognized that the invention has a much broader range of applicability.

According to an embodiment of the present invention, a fiber laser with reduced stimulated Brillouin scattering is provided. The fiber laser includes a spool having a height and characterized by a material property varying as a function of the height and a predetermined temperature gradient as a function of the height. The material property may be a groove pitch of the fiber, a wall thickness of the spool, a thermal conductivity of the spool, or the like. The fiber laser also includes a fiber having a length. The fiber is coupled to the spool and characterized by a continuous temperature gradient as a function of the length of the fiber.

According to another embodiment of the present invention, a fiber laser with reduced stimulated Brillouin scattering is provided. The fiber laser includes a spool having a height and characterized by an induced temperature gradient with the height. The fiber laser also includes a fiber wrapped on the spool and characterized by a signal power increasing along the length of the fiber. The induced temperature gradient is a function of the signal power along the fiber.

According to an alternative embodiment of the present invention, a fiber laser system is provided. The fiber laser system includes a seed source and a fiber amplifier configured to receive the seed source. The fiber amplifier includes a spool having a first surface and a second surface. A distance between the first surface and the second surface defines a spool height. The spool is characterized by a predetermined temperature gradient as a function of the spool height. The fiber amplifier also includes a fiber having a length. The fiber is coupled to the spool and characterized by a continuous temperature gradient as a function of the length of the fiber. The fiber laser system also includes a pump source optically coupled to the fiber amplifier.

An embodiment of the present invention provides a fiber laser apparatus in which an optical gain fiber of a fiber laser amplifier is wrapped onto a specially-designed spool wherein a specified continuous temperature distribution is maintained along its length. The designed temperature distribution raises the power threshold of stimulated Brillouin scattering (SBS) by effectively shortening its gain length in an optical fiber waveguide. With the reduction of SBS gain, the deleterious process that is often the limiting factor for the peak power is greatly reduced and thereby provides for an increase in the power of a fiber laser system.

According to another embodiment of the present invention, a fiber laser apparatus is provided in which an optical gain fiber of a fiber laser amplifier is wrapped onto a specially-designed spool and a specific, near optimal continuous temperature distribution is maintained along the length of the optical gain fiber. The temperature distribution along the length of the fiber is nonuniform, with the temperature gradient along the length of the fiber increasing with increasing optical signal in the core of the fiber. The designed temperature distribution raises the power threshold of stimulated Brillouin scattering (SBS) by effectively shortening its gain length in an optical fiber waveguide. With the reduction of SBS gain, the deleterious process that is often the limiting factor for peak power is greatly reduced and thereby provides a mechanism to increase the power of the fiber laser system.

According to a particular embodiment of the present invention, a spool with an externally induced temperature gradient as a function of the height of the spool is provided. Accordingly, a predetermined continuous temperature gradient is induced for the length of the fiber wrapped on the spool. The continuous temperature gradient with length of the fiber may be adjusted by changing the average temperature gradient with height of the spool, the composition and mechanical design of the spool, the location of the fiber as it is wrapped on the spool, or the like.

According to an alternative embodiment, a fiber laser with reduced stimulated Brillouin scattering is provided. The fiber laser includes a spool having a height and characterized by a predetermined temperature gradient as a function of the height. The fiber laser also includes a fiber having a length. The fiber is coupled to the spool and characterized by a continuous temperature gradient as a function of the length of the fiber. In another embodiment, the predetermined temperature gradient as a function of the height is induced by either a passive and/or an active mechanism.

Many benefits are achieved by way of the present invention over conventional techniques. For example, embodiments of the present invention provide methods and systems to achieve optical output with high average power and high peak power, while accounting for optical pumping limitations, gain limitations, optical damage to components, nonlinear impairments, and the like. More specifically, the high optical power output is accomplished by reducing the nonlinear impairment of SBS. Even more specifically, by use of embodiments of the present invention, the output power of a fiber laser may be increased due to the resulting decrease in nonlinear impairments by inducing a temperature gradient along the length of the gain fiber that is proportional to the signal power along the length of the fiber. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1:
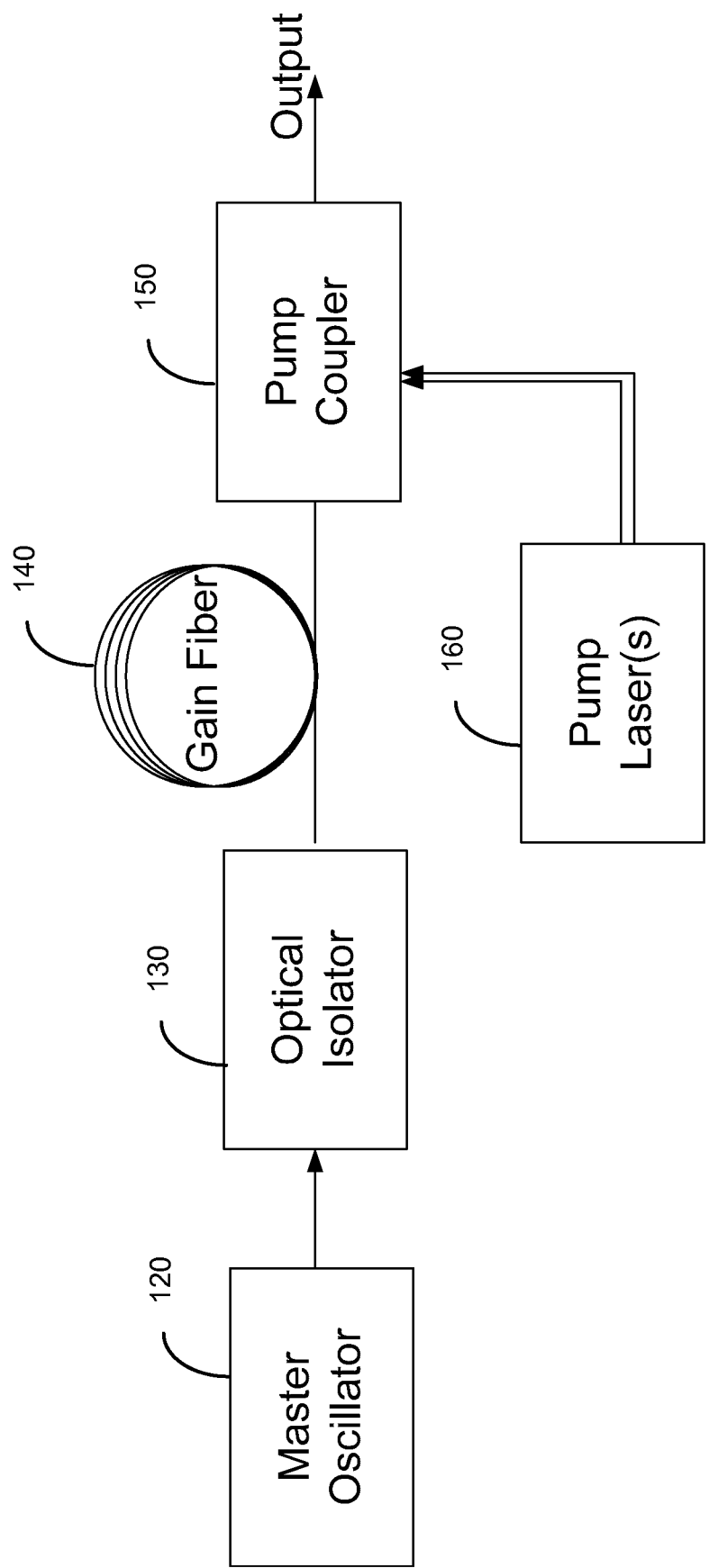
FIG. 1 is a schematic of a conventional fiber laser.

According to the present invention, techniques for optical systems are provided. More particularly, the invention includes a method and structure for increasing output power in fiber laser systems. Merely by way of example, the invention has been applied to a temperature controlled length of optical fiber characterized by reduced non-linear optical effects. But it would be recognized that the invention has a much broader range of applicability.

As fiber laser technology has advanced, some historical limits of output power levels, such as component optical damage and pump laser power, have been overcome. As a result, more fundamental limitations in high power fiber laser systems are encountered when attempting to achieve increased optical output power. One of these fundamental limitations is Stimulated Brillouin Scattering (SBS). SBS is the backscattering of the amplified signal light in a fiber by acoustic phonons in the material that are created by the non-linear interaction between the amplified signal light and the fiber material. This scattered light is shifted slightly lower in optical frequency by the Stokes frequency shift $f_b$ (typically ~10 GHz). The backward propagating signal light becomes amplified by the SBS process and by the intrinsic gain in the pumped fiber. Once the signal light increases beyond the SBS threshold power, $P_{th}$, almost the entire amplified signal light is reflected back in the direction of the seed laser, and can cause catastrophic system failure.

In a length of fiber the SBS threshold for a single polarization can be approximated as:

$$P_{th} = 21 A_e / (g_o L_e) [(\Delta v_b + \Delta v_p)/\Delta v_b], \quad (1)$$

where $A_e$ is the effective area of the fiber, $g_o$ is the material-dependent SBS gain, $L_e$ is the effective length of the fiber (which can be approximated for a linear amplifier as $L_e \cong (e^{gL} - 1)/g$, where L is the length and g is the net gain per unit length), $\Delta v_b$ is the SBS bandwidth (typically 50-100 MHz in silica fiber), and $\Delta v_p$ is the spectral bandwidth of the light propagating in the fiber.

SBS has long been known to limit the performance of fiber optic systems, and much of the art used in developing fiber lasers originates from the telecommunications industry. The SBS threshold may be increased by modifying the fiber; examples include increasing the effective area either by using multimode fiber or custom single mode fiber, engineering custom fiber designs with lower SBS gain, or reducing the fiber length. Another strategy of increasing optical powers before the onset of SBS is to increase the spectral bandwidth of the light propagating in the fiber ($\Delta v_p$). Examples of this approach include phase modulation of the input light, dithering the frequency of the input light, inducing self-phase modulation or cross-phase modulation of the light in the fiber, or using a multi-longitudinal-mode laser for a seed in a fiber laser. In applications where diffraction-limited output is required from fiber laser systems with multimode gain fibers, nonuniform doping of the active fiber support higher gain in the fundamental mode or bending the active fiber attenuates higher order modes while reducing relative loss in the fundamental mode.

It has recently been determined that in fiber lasers the intrinsic longitudinal temperature gradient produced in a pumped gain fiber causes the SBS threshold to increase when compared to a fiber of uniform temperature. Efforts to change the intrinsic temperature distribution by modifying the pumping geometry have been tested, as well as segmenting the gain fiber into discrete segments and externally controlling them at constant, but different temperatures. While conventional work suggests and demonstrates that different temperatures along the gain fiber increase the SBS threshold, no indication is provided of the optimal temperature gradient suitable for maximizing the increase of the SBS threshold.

Embodiments of the present invention utilize an apparatus in which an optical gain fiber including a fiber amplifier is wrapped onto a spool that has a designed temperature distribution along its length. The designed temperature distribution may be created through the use of active temperature elements (e.g., heating and/or cooling) located at the ends of the spool, or by other techniques.

Embodiments of the present invention provide methods and apparatus to increase the power of a fiber laser system before the SBS threshold is reached by creating a predetermined temperature gradient along the length of the gain fiber. More particularly, embodiments of the invention improve the optical power performance of narrow bandwidth, high power, single mode fiber lasers constrained by design limits that maximize other optical performance parameters. When the bandwidth of the input light cannot be broadened, the fiber effective area cannot be increased without sacrificing diffraction-limited beam quality, and the fiber is at a minimum length to decreases the gain of the amplifier section. Thus, the embodiments described herein induce a thermal gradient upon the active fiber, and thereby increase the output power available from a given fiber laser system.

The SBS gain has an intrinsic bandwidth $\Delta v_b$ and a center Stokes frequency $f_b$. The Stokes frequency is temperature dependent, following a linearized relationship $f_b(\Delta T)=f_b(0)+C_b\Delta T$. When a thermal gradient is imposed upon the length of the gain fiber, the Stokes shift frequencies vary with length, and as such, the SBS gain does not constructively increase. The net SBS gain of the total fiber length is reduced to approximately the effective SBS gain of one integral fiber section at a given temperature. Thus, the SBS threshold will be increased.

While more rigorous theoretical analysis techniques describing SBS in fibers have been developed, the following example describes a conceptual framework for understanding the description provided in the present specification. Assume a fiber has an SBS threshold given by $P_{th}°$ at uniform temperature. Now assume the fiber is heated and cooled such that there are N sections of fiber separated by a temperature difference $\Delta T_b$ from each adjacent section, with a total temperature difference of $\Delta T_{max}=N\Delta T_b$, and that $C_b\Delta T_b=\Delta v_b$ ($\Delta T_b=\Delta v_b/C_b$), such that the SBS gain profiles of each fiber section overlap very little. Therefore, the effective length of the fiber in regards to SBS gain will be decreased by approximately a factor of N, and it follows that the SBS threshold will be increased by the same factor, i.e. $P_{th}=(N)P_{th}°$.

However, this rudimentary treatment does not teach how to specify the optimal temperature gradient along the length of the fiber. A gain fiber sectioned into N different segments of equal length and differing temperatures will not increase the SBS threshold by a factor of N unless the signal optical power in the fiber is uniform in length. Conversely, a gain fiber with a nonuniform optical power (such as an amplifier) can only be optimized by imparting a nonuniform temperature gradient. This is because the nonlinear SBS gain is proportional to the power of the signal light. Thus the temperature gradient should increase as the signal optical power increases along the length of the fiber. The expression for this is:

$$dT(l)/dl \propto P_s(l), \qquad (2)$$

the rate of change of the temperature T along the fiber length l is proportional to the signal power at that point l along the fiber. From this relationship, one can calculate the ideal temperature distribution along the fiber in order to obtain maximal increase of SBS threshold.

By inducing a temperature gradient that nearly follows the relationship given in equation (2), the amount of SBS power generated at each different SBS frequency is approximately the same. Given a maximum difference in SBS frequency that is induced by the overall temperature gradient along the length of the fiber, the total SBS power generated will thus be minimized. An simplified example of this is when the signal power Ps(1) is constant along the length of the fiber. In this case a linear temperature distribution minimizes the SBS power emitted from the fiber. Another example is that of a nonconstant signal power in the fiber. The treatment of this case is described below.

Given the temperature difference one can impart along the length of the fiber, and hence the top and bottom of the spool $\Delta T_{max}$, the above relationship for the optimal temperature distribution along the length of the fiber with total length L is given by:

$$T(l)=T_1+\Delta T_{max}\int_0^l P_s(x)dx/\int_0^L P_s(x)dx. \qquad (3)$$

Here, we are adopting the notation that the temperature of the spool face that has the input fiber is $T_1$ and the temperature of the spool face that has the output fiber end is $T_2$, where $\Delta T_{max}=T_2-T_1$ and used the boundary conditions $T(0)=T_1$ and $T(L)=T_2$. If the temperature distribution follows this relationship, the increase in the SBS threshold discussed in the rudimentary treatment above can be achieved, but only if the nonlinear temperature distribution determined by the signal power is used.

The design criteria for the apparatus above are governed by the practical issues of a fiber laser system as well as providing a sufficient increase in SBS threshold. The following describes models that may be used in the design. For this example, the signal optical power distribution in the gain fiber is fit to an exponential function:

$$P_s(l)=P_s(0)e^{al}, \qquad (4)$$

where $P_s$ is the signal power at position l along the fiber, $P_s(0)$ is the input signal at the beginning of the fiber, and a is the fit constant of the exponential equation. The fit parameter a may be calculated using theoretical models or measured. The exponential fit function is approximately valid in the case of a highly saturated counter-propagating pumped fiber amplifier. The ideal temperature distribution along the fiber would be given as:

$$T(l)=T_1+\Delta T_{max}(e^{al}-1)/(e^{aL}-1). \qquad (5)$$

For simplicity in this example we assume that the gain fiber pump absorption does not contribute to the temperature gradient. This is valid in the case of low average power. A more thorough treatment will be given in an embodiment described more fully below. For a spool of total height h and fiber of total length L, highly advantageous optical fiber winding is described by the equation:

$$y=h(e^{al}-1)/(e^{aL}-1), \qquad (6)$$

where y is the height of the fiber on the spool as a function of fiber length l, and a linear temperature gradient with height is assumed ($T(y)=T_1+\Delta T_{max}y/h$). The increase in SBS threshold can be approximated as described previously as $N=\Delta T_{max}/\Delta T_b$ since the temperature gradient along the fiber is proportional to the signal intensity of the fiber.

While the minimum thermal power that the system consumes to maintain this temperature gradient is given by $P_t=-\kappa A(T_2-T_1)/h$, neglecting radial heat loss and heat produced within the fiber, there is an intrinsic, nonuniform heat source along the length of a gain fiber due to pump absorption. In the case in which the pump light is counter-propagating relative to the amplified signal, more heat is generated at the amplifier output end than at the input end. The temperature gradient formed by the two temperature elements should be in the same direction as the intrinsic heating gradient in order to minimize thermal power consumption. The nonuniform heating gradient in the gain fiber can be calculated using methods known to one of skill in the art. Once this intrinsic gradient is known, the fiber wrap to introduce the optimal induced temperature gradient can be determined.

While the above example assumed a uniform temperature gradient with height (i.e., as a function of height) on the spool, with the nonuniformity of the induced gradient being determined by the wrapping, the nonuniform temperature gradient may be formed by a variety of techniques or combinations thereof, including, but not limited to, a non-regular distribution of fiber along the spool, nonuniformity in spool surface area, a tapered cross-sectional thickness of the spool, an active element used to impose a thermal gradient, nonuniform thermal conductivity variance along the spool, combinations thereof, or the like.

A variety of improvements and details obvious to those skilled in the art are included by reference. These include, but are not limited to: grooves on the spool for fiber to sit in, fasteners over fiber to hold fiber at constant tension, addition of an insulating layer on or around the fiber spool or heating/cooling elements, the use of a hollow cylinder for the spool (or insulation filled spool), combinations thereof, or the like.

According to embodiments of the present invention, particular care is taken in wrapping the fiber on the spool. While conventional method assume that the polarization state can be affected by the tension and orientation of the fiber as it is wrapped on the spool, the present invention addresses the control of the output emission spatial profile by forces imposed on the fiber. The suppression of higher order modes propagating in a multimode fiber is highest for polarizations parallel to the diameter of the spool. Thus, a polarization-maintaining fiber should be oriented such that the axis supporting the propagating light is aligned parallel to the diameter of the spool. A constant tension is utilized in decreasing polarization and spatial inhomogeneities of the mode that propagates in the fiber due to stress-induced birefringence effects and spatial mode deformations.

Therefore, in another aspect of the invention, the absolute temperature reference of the gain fiber end-to-end thermal differential on the spool is selected to maximize the amplification of the preferred laser mode by inducing a controlled radial force onto the wrapped fiber. In combination with a preloaded tension applied along the length of the fiber, adjusting the temperature offset of the thermal gradient by a uniform amount controls the spool thermal expansion and applies an additional radial force. Thus, the apparatus is capable of varying the imposed stresses on the spool-wrapped fiber by controlling the overall thermal expansion of the spool material.

The spatial mode structure supported in the fiber waveguide is subsequently varied and higher-order modes may be suppressed by these forces. The uniform temperature shift will cause a change in the fiber tension through thermal expansion or contraction. This will accordingly change the stress along the fiber and thereby the loss of higher-order modes. While the relative temperature differential ($\Delta T$) between the ends of the gain fiber is maintained for SBS control, the absolute scale of the temperature span may be varied to affect transverse modes, and more particularly, a preferred transverse mode may be favored and maintained.

In addition to increasing the SBS threshold, minimizing power consumption and overall size are important parameters in system designs. The minimum area of the spool is typically set by minimum fiber bend radius, and increasing the area increases radial heat loss, thermal power consumption, and apparatus size. The height h of the spool may be increased to decrease the thermal power consumption. However, this is limited by practical constraints of apparatus size. Additionally, as the height is increased, so is the surface area of the spool, thus increasing radial heat loss out of the spool. The spool material is selected such that the thermal conductivity of the spool ($\kappa$) is small enough to reduce or minimize power consumption, but sufficiently larger than the material surrounding the spool, such as air or an insulator.

While this present specification describes embodiments where the fiber of interest is a gain fiber in a fiber amplifier or fiber laser, any system in which a length of fiber in a system is limited by SBS threshold will be improved by the techniques described herein and detailed in the illustrated embodiments. An example is a length of passive fiber pigtail in a high power fiber laser system. One of ordinary skill in the art would recognize many variations, modifications, and alternatives.

Wrapping the fiber around a spool offers the advantages of space efficiency, a constant bend radius, and uniform fiber tension in order to preserve polarization of the propagating light. An added benefit to wrapping the fiber around a spool is that a single spatial mode output from a multimode gain fiber is favored.

Figure 2A:
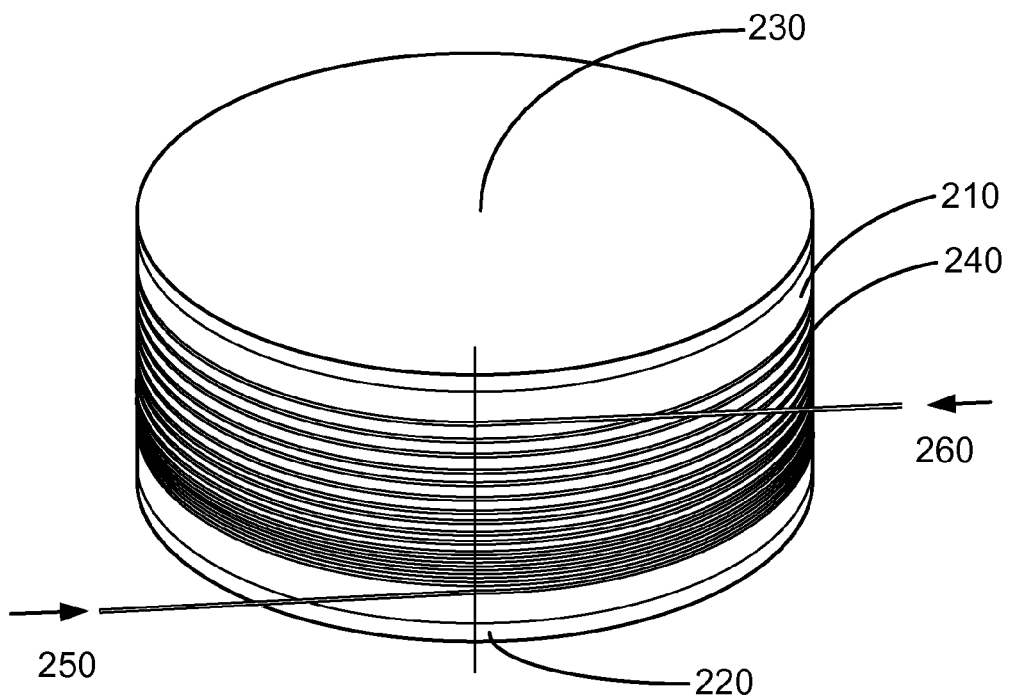
FIG. 2A is an isometric view of a schematic diagram of the temperature gradient gain fiber mount according to an embodiment of the present invention.
Figure 2B:
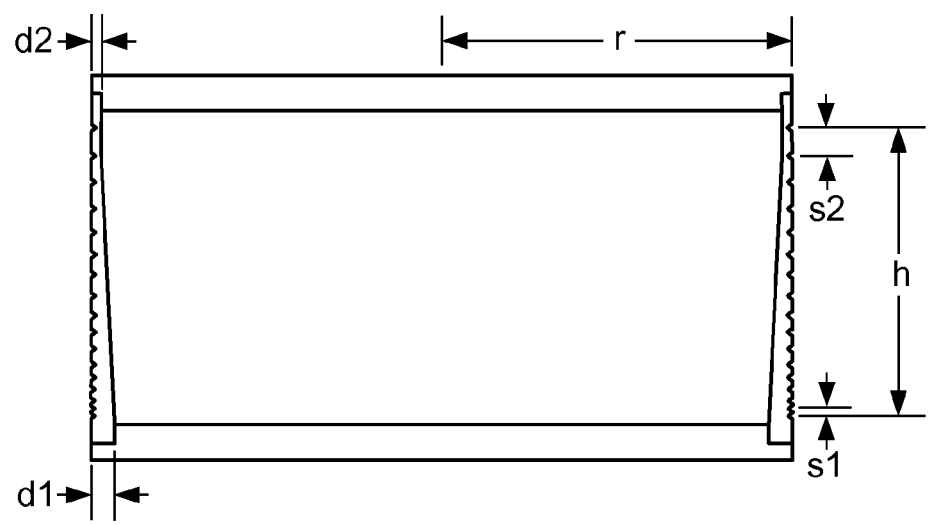
FIG. 2B is a cross-sectional view of a schematic diagram of the temperature gradient gain fiber mount according to an embodiment of the present invention.

FIG. 2A is an isometric view of a schematic diagram of the temperature gradient gain fiber mount according to an embodiment of the present invention. FIG. 2B is a cross-sectional view of a schematic diagram of the temperature gradient gain fiber mount according to an embodiment of the present invention. It will be noted that FIG. 2B includes design parameters annotation. The embodiment illustrated in FIGS. 2A and 2B induces a temperature gradient along the length of the fiber that increases with increasing optical power in the fiber.

The spool 210 consists of a thin-walled cylinder of tapered thickness (from $d_1$ to $d_2$), capped on top and bottom by plates 220 and 230 with high thermal conductivity, such as aluminum or copper. The plates are maintained by conventional thermal methods at temperatures $T_1$ (bottom) and $T_2$ (top), with $T_2 > T_1$. The inside of the hollow spool may be filled with thermal insulator material in order to reduce heat flow from top to bottom due to convection. The heat flow may be either radiative or convective in the inside of the spool. A spiral groove 240 of constant or varying (e.g., increasing) thread spacing (from $s_1$ to $s_2$) is cut on the outside of the spool to support the wound fiber in place. The groove is coated with a thermally-conductive paste or adhesive that aids the thermal contact between the fiber and the spool.

After the fiber has been wrapped the outside of the spool, the top and bottom plates are insulated as much as reasonably possible to ensure that most of the heat transfer from top to the bottom takes place through the spool wall. Plates with low surface emissivities are desirable to minimize radiative thermal coupling and polished interior surfaces reduces emissivities. The seed light 250 enters the fiber at the bottom end, and the pump light 260 enters the fiber at the top end. The cylinder wall material may be made of stainless steel or other moderate-to-low thermal conductivity materials so as to achieve an axial thermal gradient. Use of a spool material characterized by a uniform thermal conductivity as a function of height will work together with other design parameters (e.g., cylinder wall thickness) to provide for a temperature gradient as a function of spool height. Thus, an engineered, predetermined, or designed temperature gradient can be provided along the length of the spool. If a ring-shaped heater and/or a ring-shaped cooling device are used, one or both of the end caps may be rings instead of plates, or they may be machined from the same piece as the cylindrical wall, or they may be primarily insulating. The lower end of the spool is typically mounted to Peltier heat pump that is coupled to a heat sink.

The temperature gradient in the wrapped fiber preferably has an average value of $(T_2-T_1)/L$, where L is the length of the fiber. Both the nonuniform thread spacing ($s_1$ to $s_2$) and the nonuniform wall thickness ($d_1$ to $d_2$) illustrated in FIGS. 2A and 2B are designed to increase the temperature gradient along the fiber near the top end, so that the region of the fiber that experiences the greatest optical intensities (and thus the greatest potential for SBS) also experiences the greatest temperature gradient and local SBS threshold, $P_{th}$.

In a particular embodiment, the spool has outside radius r=40 mm, and length of silica gain fiber with a length L=2 m is used. The fiber has a change in Stokes frequency with temperature of $C_b$=2 MHz/K and an SBS gain bandwidth $\Delta\nu_b$=36 MHz. The fiber covers a height of h=20 mm on the spool. The formula for the height of the fiber, y, versus distance along the fiber, l, is $$y = al + bl^2, \quad (7)$$

where a=0.004 and b=0.000003 mm$^{-1}$. The wall thickness, d, varies linearly from $d_1$=2.5 mm at the bottom to $d_2$=1.0 mm at the top:

$$d = d_1 - (d_1-d_2)y/h. \quad (8)$$

The heat produced in the fiber per unit fiber length is approximated by an increasing exponential in l having rate α. If the total heat power produced by the fiber is $P_0$, then the heat produced per unit fiber length, q(l), is given by:

$$q(l) = \alpha P_0 / [e^{(\alpha L)} - 1] e^{(\alpha l)}, \quad (9)$$

and the heat produced per unit height, Q(y), is given by $$Q(y) = \alpha P_0 [(e^{(\alpha L)} - 1)(a^2 + 4by)]^{-1} e^{[(\alpha/2b)(-a + (a2+4by)^{1/2})]}. \quad (10)$$

The steady state heat equation for temperature T in y is:

$$(d/dy)[\kappa A(y)(dT/dy)] = -Q(y), \quad (11)$$

where κ is the thermal conductivity of the thin cylinder material and A(y) is the cross sectional area of the thin cylinder and can be approximated by $2\pi r t(y)$ when r>>t.

The heat equation above can be solved by a combination of analytic and numerical integration, using boundary conditions $T(0)=T_1$, $T(h)=T_2$.

In an embodiment, the top thermal element is a resistive heater and the bottom thermal element is a thermoelectric cooler, both elements being controlled by temperature controllers. In addition to this embodiment, other techniques known in the art to impart a designated difference in temperature between two surfaces may be used, along with other techniques for controlling that temperature. In a particular embodiment, the two thermal elements are controlled at $T_1$=293 K and $T_2$=363 K.

Figure 3:
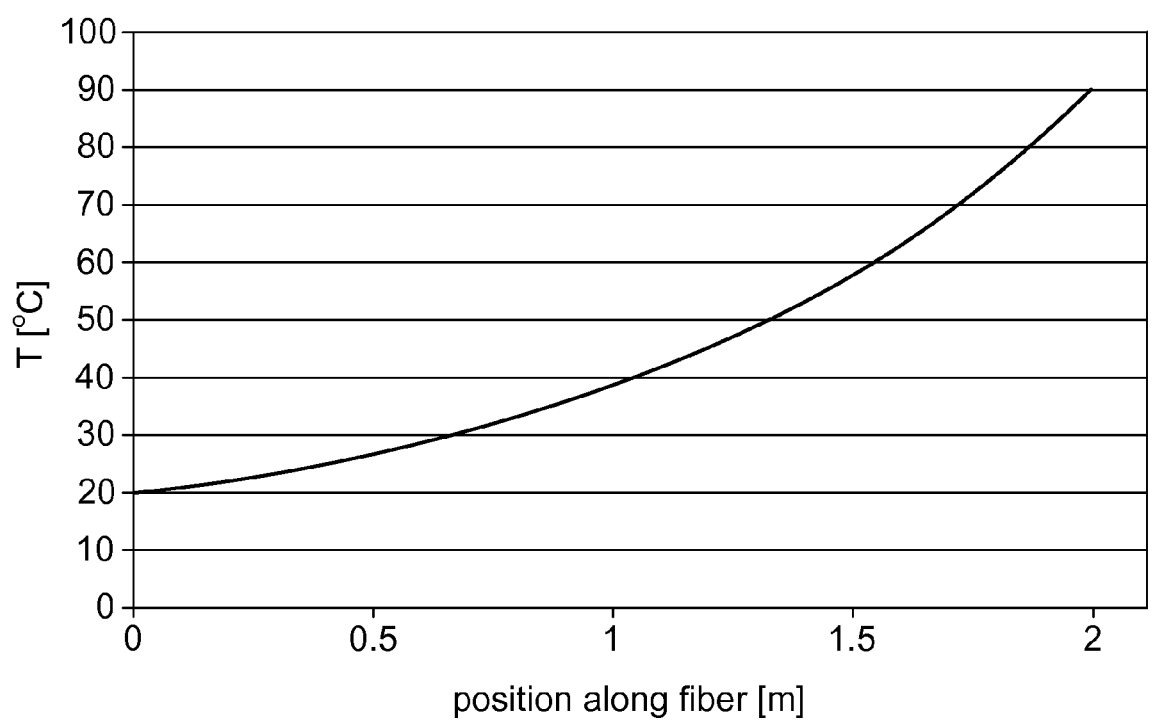
FIG. 3 is modeled temperature distribution along the fiber according to a particular embodiment of the invention.

The resulting modeled temperature distribution along the 2 m fiber is shown in FIG. 3. In this model $P_0$=3 W, α=0.00097 mm$^{-1}$, and κ=16.2 W/(m·K). The resulting effective length for SBS gain near the end of the fiber is 0.25 m. Thus, the resulting increase in SBS threshold relative to a constant temperature fiber is N=2/0.25=8 times. The bottom temperature element must be capable of pumping at least $P_t$=25 W from the spool into the heat sink, a requirement that is easily met with commercially available thermoelectric coolers.

Figure 4:
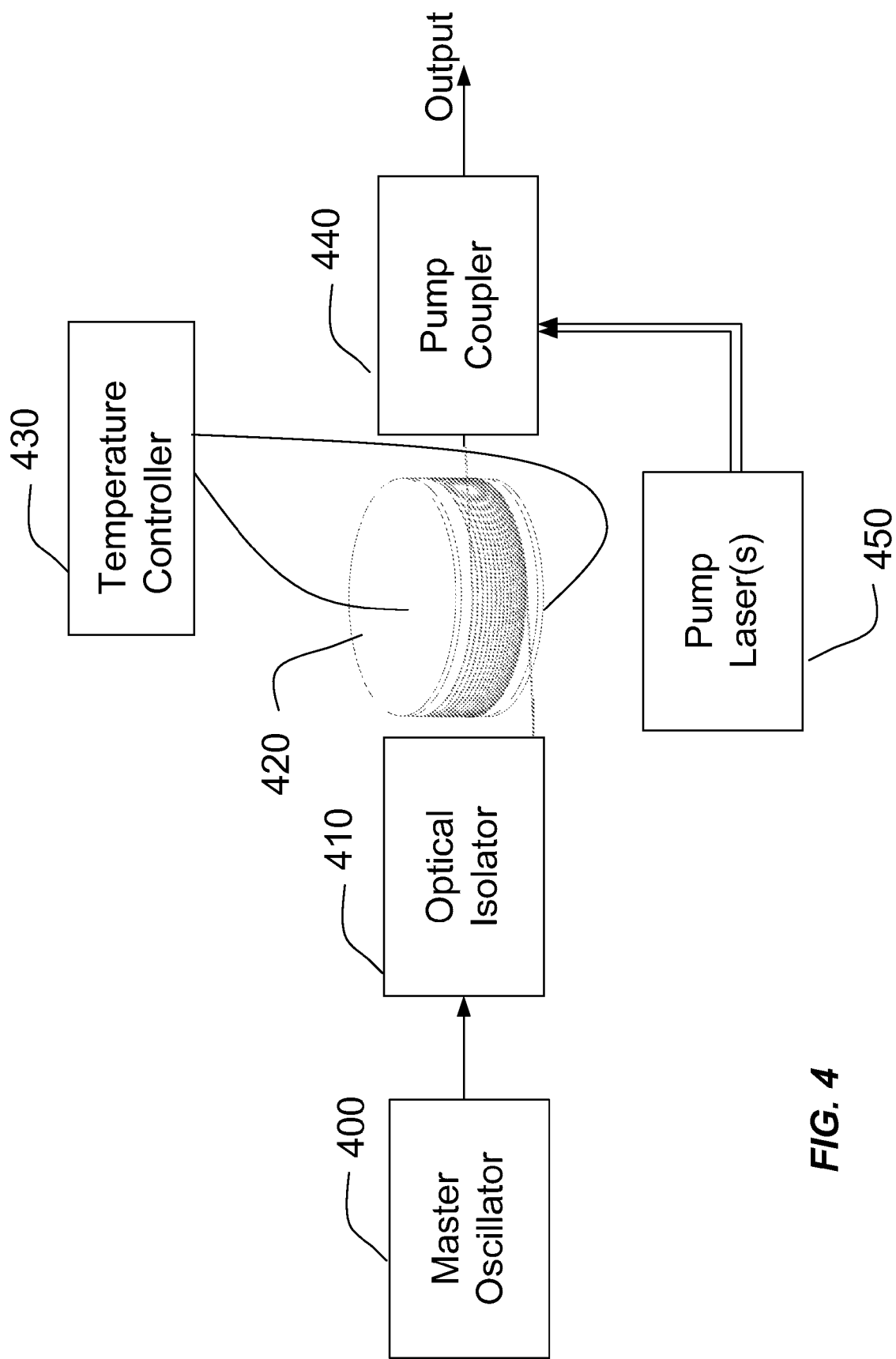
FIG. 4 is a simplified schematic illustration of a fiber laser system according to an embodiment of the present invention.

FIG. 4 is a simplified schematic illustration of a fiber laser system according to an embodiment of the present invention. The seed laser 400 emits a low power optical signal that is coupled into the amplifier section 420 through an optical isolator 410. The amplifier section consists of a length of gain fiber that is pumped by one or more pump lasers 450 (typically diode lasers) through a pump coupler 440. The amplifier section 420 includes a gain fiber wrapped onto a spool (described more fully throughout the present specification) that provides a predetermined temperature distribution along the length of the fiber. In a particular embodiment, an optimal continuous temperature is maintained along the length of the fiber through the use of controller 430.

In an embodiment, the controller senses the temperature of the spool at one or more points along the spool utilizing thermocouples or other temperature sensors (not shown). Utilizing the data from the thermocouples or other temperature sensors, the temperature controller adjusts a drive signal provided to the spool to thereby maintain the temperature at the one or more points of the spool at the predetermined values. As an example, the temperature applied to a first surface (e.g., a top surface) and a second surface (e.g., a bottom surface) of the spool could be controlled in response to measured temperatures as a function of spool height. One of ordinary skill in the art would recognize many variations, modifications, and alternatives.

Figure 5:
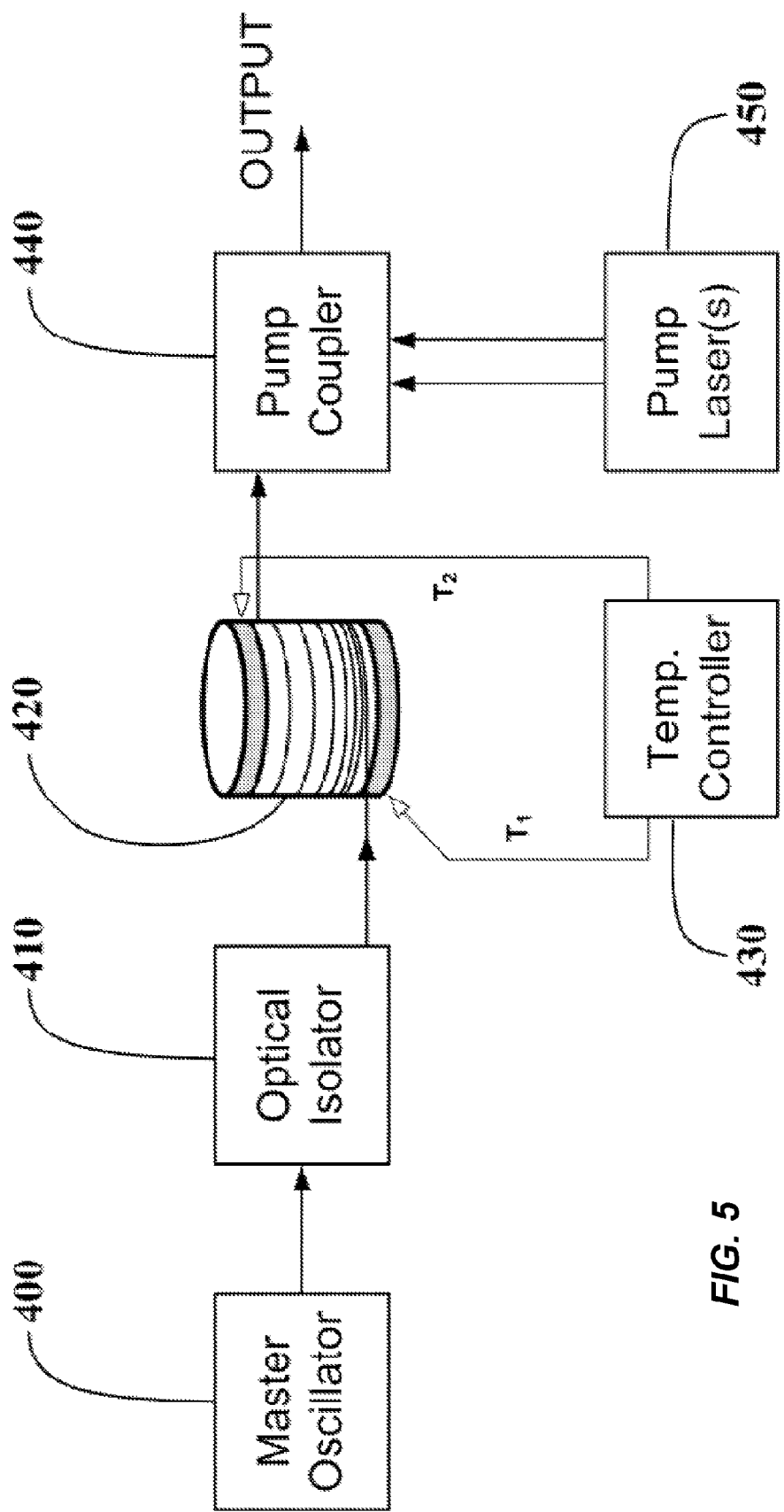
FIG. 5 is an alternative simplified schematic illustration of a fiber laser system according to an embodiment of the present invention.

FIG. 5 is an alternative simplified schematic illustration of a fiber laser system according to an embodiment of the present invention. As illustrated in FIG. 5, the same reference numbers are used for the same elements that are illustrated in FIG. 4. As illustrated, through the use of temperature controller 430, predetermined temperatures ($T_1$ and $T_2$) are controlled at the two opposing faces of the spool 420.

The examples and embodiments described herein are for illustrative purposes only. Various modifications or changes in light thereof will be suggested to persons skilled in the art and are to be included within the spirit and purview of this application and scope of the appended claims. It is not intended that the invention be limited, except as indicated by the appended claims.

What is claimed is:

1. A fiber laser with reduced stimulated Brillouin scattering, the fiber laser comprising:
    a spool having a height and characterized by:
        a material property varying as a function of the height; and
        a predetermined temperature gradient as a function of the height;
    a fiber having a length, wherein the fiber is coupled to the spool and characterized by a continuous temperature gradient as a function of the length of the fiber; and
    a controller coupled to the spool and configured to provide the predetermined temperature gradient as a function of height of the spool.

2. The fiber laser of claim 1 wherein the material property comprises a groove pitch of the fiber.

3. The fiber laser of claim 1 wherein the material property comprises a wall thickness of the spool.

4. The fiber laser of claim 1 wherein the material property comprises a thermal conductivity of the spool.

5. The fiber laser of claim 1 wherein a first portion of the spool is characterized by a first temperature and a second portion of the spool is characterized by a second temperature, the second temperature being different from the first temperature.

6. The fiber laser of claim 1 further comprising
a second spool having a second height and characterized by:
a second material property varying as a function of the second height; and
a second predetermined temperature gradient as a function of the second height.

7. The fiber laser of claim 1 wherein the spool is characterized by a diameter that is nonuniform as a function of height.

8. The fiber laser of claim 1 wherein the fiber comprises a gain fiber and a passive fiber.

9. A fiber laser with reduced stimulated Brillouin scattering, the fiber laser comprising:
a spool having a height and characterized by an induced temperature gradient with the height and a material property varying as a function of height;
a fiber wrapped on the spool and characterized by a signal power increasing along the length of the fiber, wherein the induced temperature gradient is a function of the signal power along the fiber; and
a controller coupled to the spool and configured to provide the induced temperature gradient with height.

10. The fiber laser of claim 9 wherein the function is a monotonically increasing function.

11. The fiber laser of claim 9 wherein the induced temperature gradient is induced by a first temperature at a first portion of the spool and a second temperature different from the first temperature at a second portion of the spool.

12. The fiber laser of claim 9 wherein a wall thickness of the spool is nonuniform with the height.

13. The fiber laser of claim 9 wherein a wrapping pitch of the fiber on the spool is nonuniform with height.

14. The fiber laser of claim 9 further comprising:
a second spool having a second height and characterized by:
a second material property varying as a function of the second height; and
a second predetermined temperature gradient as a function of the second height.

15. The fiber laser of claim 9 wherein a thermal conductivity of the spool is nonuniform with height.

16. The fiber laser of claim 9 wherein a diameter of the spool is nonuniform with height.

17. The fiber laser of claim 9 wherein the fiber comprises a gain fiber and a passive fiber.

18. A fiber laser system comprising:
a seed source;
a fiber amplifier configured to receive the seed source, wherein the fiber amplifier includes:
a spool having a first surface and a second surface, a distance between the first surface and the second surface defining a spool height, wherein the spool is characterized by a predetermined temperature gradient as a function of the spool height; and
a fiber having a length, wherein the fiber is coupled to the spool and characterized by a continuous temperature gradient as a function of the length of the fiber;
a pump source optically coupled to the fiber amplifier; and
a temperature controller in electrical communication with the spool.

19. The fiber laser of claim 18 wherein the material property comprises a groove pitch of the fiber.

20. The fiber laser of claim 18 wherein the material property comprises a wall thickness of the spool.

21. The fiber laser of claim 18 wherein the material property comprises a thermal conductivity of the spool.

22. The fiber laser of claim 18 wherein the spool is characterized by a diameter that is nonuniform as a function of height.

23. The fiber laser of claim 18 wherein the fiber comprises a gain fiber and a passive fiber.

* * * * *